(12) United States Patent
Bhandari et al.

(10) Patent No.: US 11,831,492 B2
(45) Date of Patent: Nov. 28, 2023

(54) GROUP-BASED NETWORK EVENT NOTIFICATION

(71) Applicant: NICIRA, INC., Palo Alto, CA (US)

(72) Inventors: Vaibhav Bhandari, Pune (IN); Naveen Ramaswamy, Pune (IN)

(73) Assignee: NICIRA, INC., Palo Alto, CA (US)

( * ) Notice: Subject to any disclaimer, the term of this patent is extended or adjusted under 35 U.S.C. 154(b) by 548 days.

(21) Appl. No.: 15/342,123

(22) Filed: Nov. 3, 2016

(65) Prior Publication Data

US 2018/0054351 A1  Feb. 22, 2018

(30) Foreign Application Priority Data

Aug. 16, 2016 (IN) ............... 201641027832

(51) Int. Cl.
*H04L 41/0686* (2022.01)
*H04L 41/0604* (2022.01)

(52) U.S. Cl.
CPC ...... *H04L 41/0686* (2013.01); *H04L 41/0604* (2013.01); *H04L 41/0618* (2013.01)

(58) Field of Classification Search
CPC ............ H04L 41/0604; H04L 41/0618; H04L 41/0686; H04L 41/0609; H04L 41/0627; H04L 41/065; H04L 41/0681; H04L 41/069

See application file for complete search history.

(56) References Cited

U.S. PATENT DOCUMENTS

| | | | | |
|---|---|---|---|---|
| 5,708,814 A * | 1/1998 | Short | ............... | G06F 13/24 710/260 |
| 7,787,390 B1 * | 8/2010 | Orr | ............... | H04L 41/0681 370/252 |
| 8,332,502 B1 * | 12/2012 | Neuhaus | ............... | H04L 41/0613 709/223 |
| 9,049,105 B1 * | 6/2015 | Feinstein | ............... | H04L 41/069 |
| 9,325,568 B2 * | 4/2016 | Racz | ............... | H04L 41/0686 |
| 2008/0275956 A1 * | 11/2008 | Saxena | ............... | G06Q 10/02 709/206 |
| 2010/0191836 A1 * | 7/2010 | Knight | ............... | H04M 3/436 709/220 |
| 2011/0320469 A1 * | 12/2011 | Canessa | ............... | G06F 19/321 707/758 |
| 2012/0239541 A1 * | 9/2012 | Tsukahara | ............... | G06Q 40/02 705/35 |

(Continued)

*Primary Examiner* — Kamal B Divecha
*Assistant Examiner* — Sujana Khakural
(74) *Attorney, Agent, or Firm* — SU IP CONSULTING (57) ABSTRACT

Example methods are provided for network management entity to perform group-based network event notification in a network environment that includes the network management entity and a notification consumer. The method may comprise: in response to detection of a first network event associated with a group, withholding notification of the first network event to the notification consumer; and in response to detection of a second network event associated with the group, withholding notification of the second network event to the notification consumer. The method may further comprise generating a group notification associated with the group, wherein the group notification is an aggregate notification to report the detection of at least the first network event and second network event; and sending the group notification to the notification consumer.

18 Claims, 6 Drawing Sheets

(56) References Cited

U.S. PATENT DOCUMENTS

| | | | |
|---|---|---|---|
| 2013/0311618 A1* | 11/2013 | Ruetschi | H04L 67/10 |
| | | | 709/219 |
| 2014/0280892 A1* | 9/2014 | Reynolds | H04L 43/028 |
| | | | 709/224 |
| 2015/0254969 A1* | 9/2015 | Bishop | H04L 41/0618 |
| | | | 340/506 |
| 2015/0295778 A1* | 10/2015 | Hsiao | H04L 43/0894 |
| | | | 715/736 |
| 2016/0062540 A1* | 3/2016 | Yang | G06F 3/0481 |
| | | | 345/173 |
| 2017/0046374 A1* | 2/2017 | Fletcher | G06F 3/0484 |
| 2017/0238279 A1* | 8/2017 | Jeong | H04W 4/08 |
| | | | 455/458 |
| 2018/0123864 A1* | 5/2018 | Tucker | H04L 41/065 |
| 2018/0219721 A1* | 8/2018 | Sawada | G05B 23/0272 |
| 2018/0239666 A1* | 8/2018 | Manor | G06F 11/0781 |

\* cited by examiner

```
Group Configuration Information 126

1    # groupOID
2    group.config=1
3    group.upgrade=2
4
5    # oid.TrapComponent.EventCode=TrapOidSuffix|
6    # groupOidPropertyKey
7    oid.Security.240000=1|group.config
8    oid.Security.240001=2|group.config
9    oid.Security.240002=3|group.config
10   oid.Security.240003=4|group.config
11   oid.Security.240004=5|group.config
12
13   oid.DistributedFirewall.301001=1|group.upgrade
14   oid.DistributedFirewall.301002=2|group.upgrade
15   oid.DistributedFirewall.301003=3|group.upgrade
16   oid.DistributedFirewall.301021=4|group.upgrade
17   oid.DistributedFirewall.301022=5|group.upgrade
18   oid.DistributedFirewall.301031=6
19   oid.DistributedFirewall.301032=7|group.config
20   oid.DistributedFirewall.301033=8|group.config
```

| Event Code | Explanation | Module Name | Severity | Group Notification OID | Timestamp |
|---|---|---|---|---|---|
| 240000 | Added an IP to authentication black list | Security | Critical | 1.3.6.1.4.1.6876.90.1.2.0.1.0.1 | t1 |
| 240000 | Added an IP to authentication black list | Security | Critical | 1.3.6.1.4.1.6876.90.1.2.0.1.0.1 | t1 |
| 240001 | Removed an IP from authentication black list | Security | Informational | 1.3.6.1.4.1.6876.90.1.2.0.1.0.1 | t1 |

610

| Event Code | Explanation | Module Name | Severity | Group Notification OID | Timestamp |
|---|---|---|---|---|---|
| 301001 | Upgrade on host initiated | Distributed Firewall | Informational | 1.3.6.1.4.1.6876.90.1.2.0.1.0.2 | t2 |
| 301003 | Upgrade failed on host | Distributed Firewall | Critical | 1.3.6.1.4.1.6876.90.1.2.0.1.0.2 | t2 |
| 301003 | Upgrade failed on host | Distributed Firewall | Critical | 1.3.6.1.4.1.6876.90.1.2.0.1.0.2 | t2 |
| 301002 | Upgrade on host successful | Distributed Firewall | Informational | 1.3.6.1.4.1.6876.90.1.2.0.1.0.2 | t2 |

Fig. 6

GROUP-BASED NETWORK EVENT NOTIFICATION

RELATED APPLICATIONS

Benefit is claimed under 35 U.S.C. 119(a)-(d) to Foreign Application Serial No. 201641027832 filed in India entitled "GROUP-BASED NETWORK EVENT NOTIFICATION", on Aug. 16, 2016, by NICIRA, INC., which is herein incorporated in its entirety by reference for all purposes.

BACKGROUND

Unless otherwise indicated herein, the approaches described in this section are not admitted to be prior art by inclusion in this section.

Network management protocols, such as Simple Network Management Protocol (SNMP), provide a network management tool for monitoring various network elements (e.g., hosts, servers, network devices, etc.) in a network environment. For example, SNMP includes a set of standards for the definition and storage of network management information, as well as a protocol for exchanging the information between an SNMP agent and an SNMP manager. In general, the SNMP agent is responsible for monitoring and gathering information about the network elements. The SNMP agent may also be configured to inform the SNMP manager about certain network events through notifications such as SNMP trap messages. However, in practice, there may be a large volume of SNMP trap messages from the SNMP agent to the SNMP manager, which creates a lot of processing burden on the SNMP manager.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of network event notification will now be explained in more detail using FIG. 1, which is a schematic diagram illustrating example network environment 100 in which group-based network event notification may be performed. It should be understood that, depending on the desired implementation network environment 100 may include additional and/or alternative components than that shown in FIG. 1.

Figure 1:
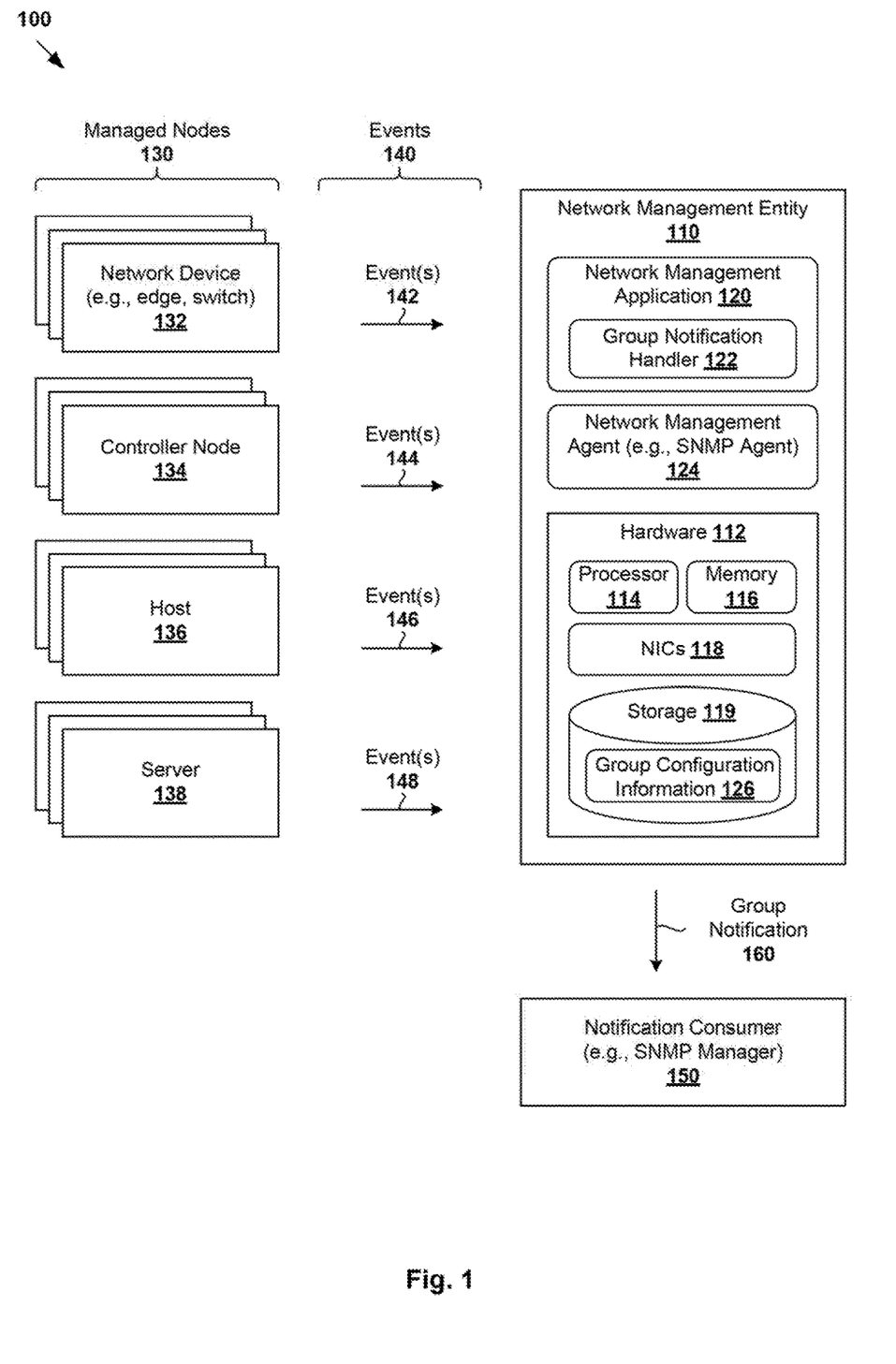
FIG. 1, which is a schematic diagram illustrating an example network environment in which group-based network event notification may be performed.

In the example in FIG. 1, network management entity 110 is configured to monitor various network elements 130 (referred to as "managed nodes") in network environment 100. For example, network management application 120 may be configured to detect network events 140 associated with managed nodes 130, and report them to notification consumer 150 via network management agent 124. To support network management application 120 and agent 124, network management entity 110 may include any suitable hardware 112, such as processor(s) 114 memory 116, network interface controller(s) 118, storage 119, etc.

In practice, network management entity 110 may be any suitable management component, such as a network virtualization manager (e.g., NSX manager) of a network virtualization platform, such as VMware's NSX (a trademark of VMware, Inc.), etc. For example, through network virtualization, benefits similar to server virtualization may be derived for networking services. Using network management entity 110, software-based virtual networks may be provisioned, changed, stored, deleted and restored programmatically without having to reconfigure the underlying physical hardware. Network management entity 110 may be implemented using one or more physical and/or virtual entities. Notification consumer 150 may be any receiver host to which notifications are sent by network management entity 110. In practice, one or more notification consumers 150 may be configured via any suitable interface (e.g., VMware's vSphere client, etc.). For each notification consumer 150 an Internet Protocol (IP) address, a port number (e.g., User Datagram Protocol (UDP) port), user-defined string to be sent out as part of a notification trap, etc., may be configured.

Network management may be performed using any suitable protocol Using Simple Network Management Protocol (SNMP) for example, network management agent 124 may be an SNMP agent, and notification consumer 150 may be an SNMP manager. In this case, SNMP manager 150 may be notified of events 140 using event notifications in the form of SNMP trap messages. The mapping between event 140 and an SNMP trap is configurable. Each event 140 may or may not be reported to SNMP manager 150 depending on whether a trap is configured for that event 140. Events 140 may relate to configuration changes; network parameters (e.g., utilization, throughput, availability, response time, etc.) exceeding predetermined thresholds; device or network failures; security threats, etc. Events 140 may be "detected" using any suitable approach, such as based on a message or signal received from managed node 130, an exception or error detected by network management entity 110 as part of exception handling, etc.

Conventionally, a large volume of event notifications (e.g., SNMP traps) may be sent from network management entity 110 to SNMP manager 150. This is because an individual notification is usually sent to SNMP manager 150 for each and every detected event 140. For example, if 1000 events 140 associated with managed nodes 130 are detected and notification is enabled for each of those events, 1000 individual notifications will be sent to SNMP manager 150. This problem is exacerbated in a virtualized computing environment, such as a Software-Defined Data Center (SDDC), in which there may be hundreds or thousands of managed nodes 130 that include both physical entities and virtual entities.

For example in FIG. 1, managed nodes 130 may include network devices 132 (e.g., edge, router, switch, etc.), controller nodes 134 (e.g., NSX controller nodes), hosts 136, management servers 138 (e.g., VMware's vCenter servers), etc. Through server virtualization, each host 136 may implement a hypervisor to support multiple virtual machines running different operating systems and applications. For example, events (see 146) from host 136 may be associated with security policy updates at a distributed firewall (DFW) module implemented on the hypervisor, resource utilization of the virtual machines, etc. Further, network events 140 may include network outage or routing failure events (see 142) detected by network devices 132; configuration change events (see 144) from controller nodes 134; threshold crossing events (see 148) detected by management servers 138, etc.

According to the conventional approach, the large volume of individual event notifications may consume a lot of computing resources of both network management entity 110 and SNMP manager 150. This also consumes a lot of network resources connecting network management entity 110 and SNMP manager 150, potentially adversely affecting other network traffic that may be more critical. The large volume of event notifications may also overwhelm an end user (e.g., network administrator) operating SNMP manager 150. For example, verbose information in each event notification may result in "information overload" for the end user responsible for analyzing the individual event notifications.

Group-Based Network Event Notification

According to examples of the present disclosure, the number of event notifications from network management entity 110 to SNMP manager 150 may be reduced to ease the burden on computing resources and network resources in network environment 100. In particular, instead of sending an individual notification for each and every detected event 140, network management entity 110 generates and sends a "group notification" to aggregate reporting of multiple events 140. To facilitate group notification, a group may be configured to include events whose notifications may be aggregated. As used herein, the term "group" may refer generally to a collection of one or more events that are assigned to the group, such as based on similarity in their property or behavior, etc.

Figure 2:
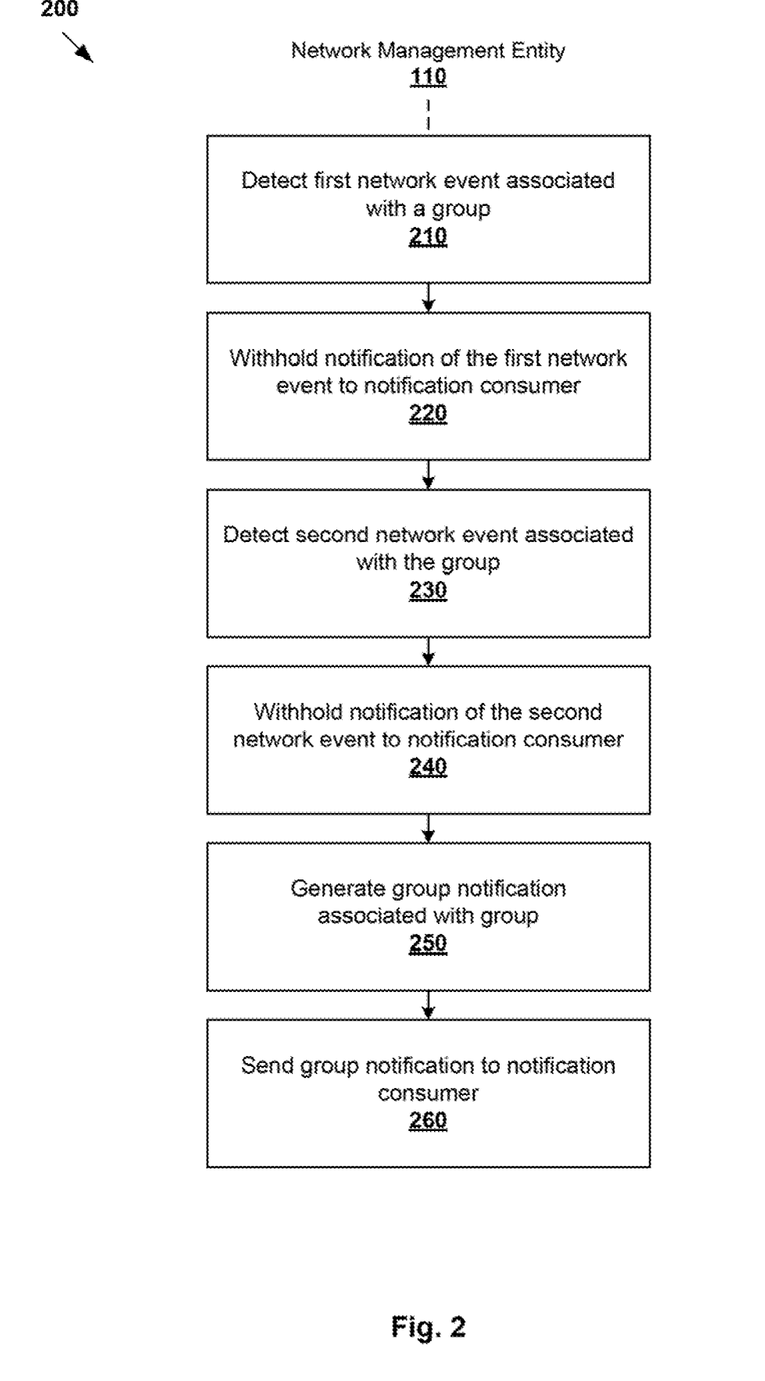
FIG. 2 is a flowchart of an example process for a network management entity to perform group-based network management event notification in a network environment.

In more detail, FIG. 2 is a flowchart of example process 200 for network management entity 110 to perform group-based network event notification in network environment 100. Example process 200 may include one or more operations, functions, or actions illustrated by one or more blocks, such as 210 to 260. The various blocks may be combined into fewer blocks, divided into additional blocks, and/or eliminated depending on the desired implementation.

Example process 200 may be performed by network management entity 110, such as using network management application 120 and more particularly group notification handler 122. In the following, various examples will be described with reference to SNMP-based network management application 120, SNMP agent 124 and SNMP manager 150. It should be understood that examples of the present disclosure are not limited to SNMP, and any other network management protocol may be used.

At 210 and 220 in FIG. 2, in response to detection of a first event associated with a group, network management entity 110 withholds notification of the first event to SNMP manager 150. At 230 and 240 in FIG. 2, in response to detection of a second event associated with a group, network management entity 110 also withholds notification of the second event to SNMP manager 150.

For example in FIG. 1, the first event may be network outage event 142 from network device 132. In this case, network management entity 110 refrains from sending an individual notification relating to the first event to SNMP manager 150. The first and second events may be triggered by the same managed node 130, or different managed nodes 130. For example, the second event may be security policy update event 146 from a hypervisor module of host 136, or another network outage event 142 from network device 132. Network management entity 110 also refrains from sending another individual notification to SNMP manager 150.

At 250 and 260 in FIG. 2, network management entity 110 generates a group notification (see 160 in FIG. 1) associated with the group, and sends group notification 160 to SNMP manager 150. As used herein, the term "group notification" may refer generally to an aggregate notification (e.g., SNMP trap message) to report detection of multiple events associated with a group. Group notification 160 may be generated and sent responsive to determination that one or more conditions have been satisfied, such as a time-based condition (e.g., every five minutes), count-based condition (e.g., every ten events), a combination thereof (e.g., every five minutes or ten events, whichever reached first), etc. This way, group notification provides a mechanism for "throttling" the flow of notifications from network management entity 110 to SNMP manager 150. Different groups may be associated with different conditions for group notification.

Although example process 200 in FIG. 2 refers to "first" and "second" events for simplicity, it should be understood that the group notification may report any suitable number of events. Compared to individual notifications, sending fewer group notifications eases the computational burden on SNMP manager 150 and reduces the likelihood of overwhelming an end user (e.g., network administrator). In practice, group notification 160 may include any suitable information, such as identifier of the group, a total count of network events detected, a summary of network events detected and a timestamp of the group notification, etc. The summary in group notification 160 helps to reduce the verbosity of conventional individual notifications.

In the following, various examples will be explained using FIG. 3 to FIG. 6. In particular, an example detailed process will be explained using FIG. 3, example group configuration using FIG. 4A and FIG. 4B and example group notifications using FIG. 6 and FIG. 6. Examples of the present disclosure may be performed by network management entity 110 using any suitable module(s), such as group notification handler 122 of network management application 120 and SNMP agent 124, etc. Although shown as separate components in FIG. 1, agent 124 may be implemented as part of network management application 120, etc.

Group Configuration

Figure 3:
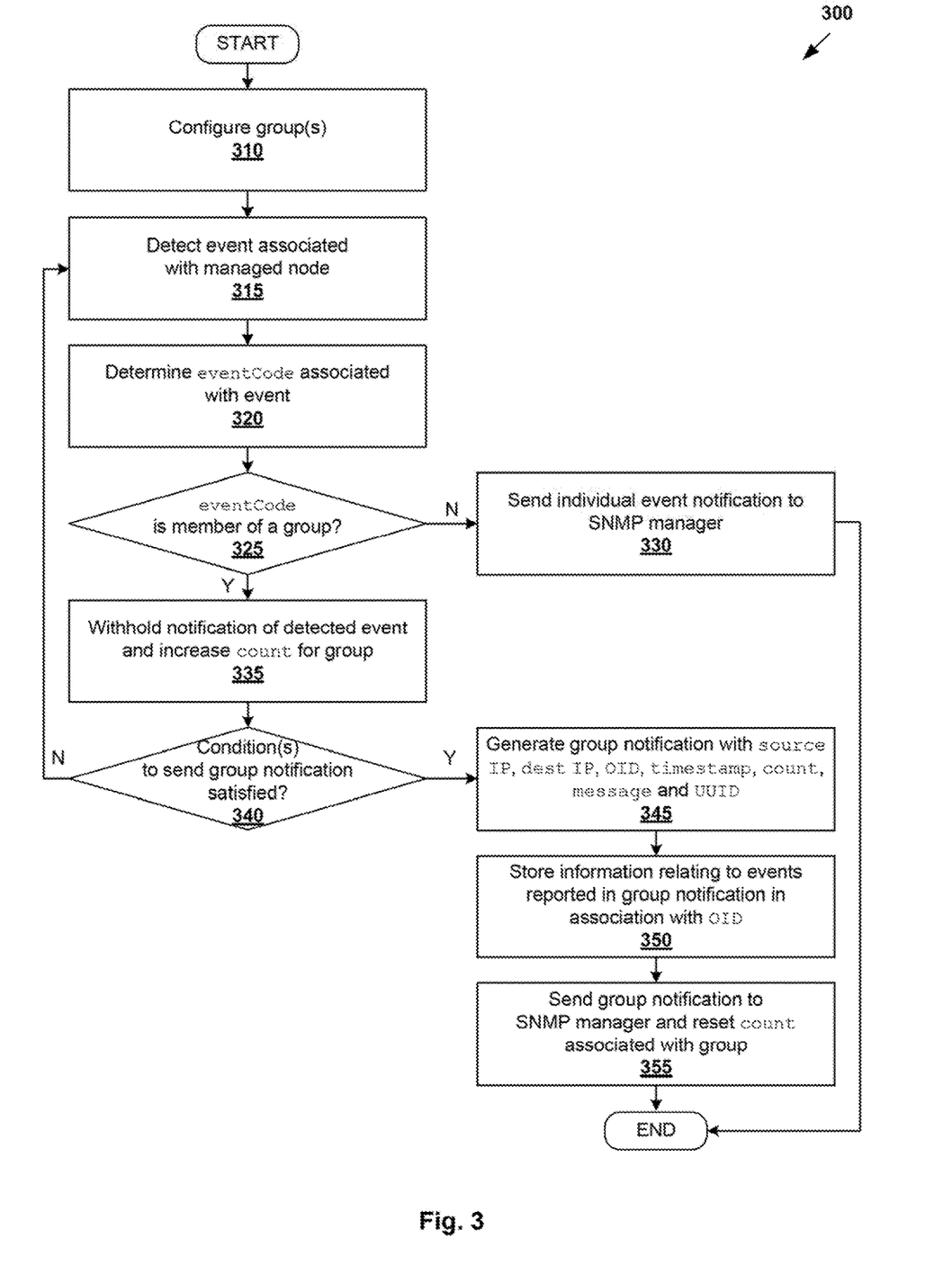
FIG. 3 is a flowchart of an example detailed process for a network management entity to perform group-based network management event notification in a network environment.

FIG. 3 is a flowchart of example detailed process 300 for network management entity 110 to perform group-based network management event notification in network environment 100. Example process 300 may include one or more operations, functions, or actions illustrated by one or more blocks, such as 310 to 350. The various blocks may be combined into fewer blocks, divided into additional blocks, and/or eliminated depending on the desired implementation.

Figure 4A:
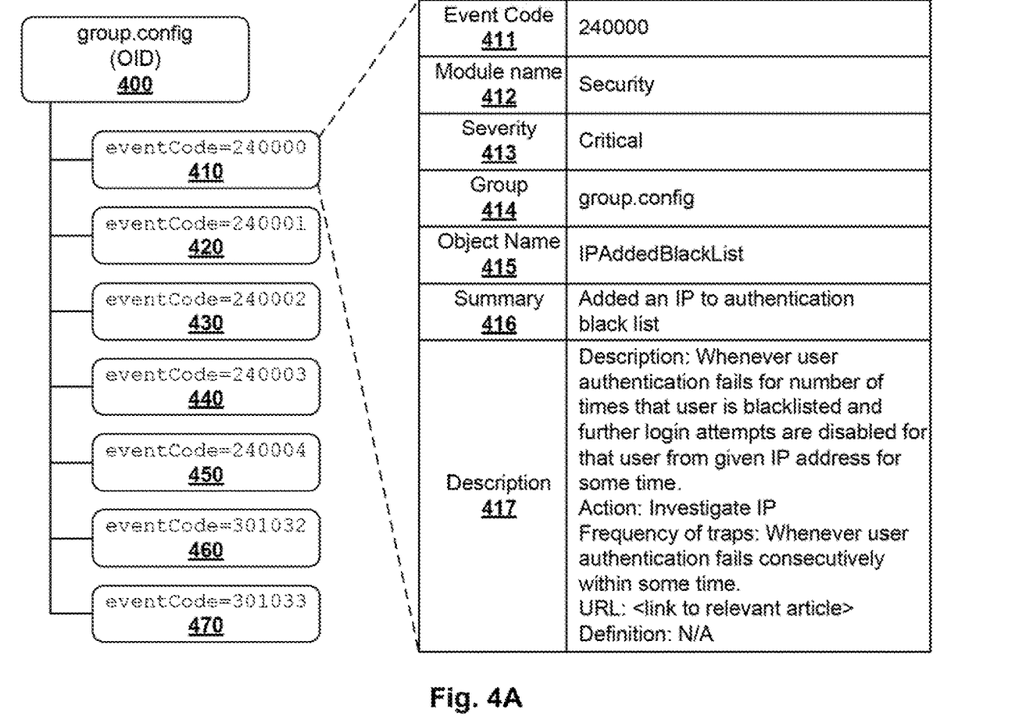
FIG. 4A is a schematic diagram of an example group associated with multiple events.

Referring first to 310 in FIG. 3, a group may be configured by assigning one or more events to the group. One example is shown in FIG. 4A, which is a schematic diagram of an example group associated with multiple events. In particular, a group called "group.config" (see 400) includes various member events with respective event codes "240000" (see 410), "240001" (see 420), "240002" (see 430), "240003" (see 440), "240004" (see 450), "301032" (see 460) and "301033" (see 470). In this example, events 410-470 are all related to configurational changes at managed nodes 130. Grouping similar events 410-470 allows aggregation of their individual notifications.

Each event (e.g., see 410) may have various properties, such, as event code (see 411); module name or event source triggering the event (see 412); level of severity (see 413) such as high, critical, major, medium, low or informational; assigned group (see 414); object name (see 415); summary (see 416) that provides a one-line description of the event; and detailed description (see 417) that sets out a description, action required, frequency, uniform resource locator (URL) to related articles, definition of technical terms, etc. For example, event 410 with event code="240000" is triggered by a security module when an Internet Protocol (IP) address is added to an authentication blacklist.

In practice, the group configuration at 310 in FIG. 3 may be performed based on an end user's input. The input may be received via an interface (e.g., graphical user interface, command line interface, etc.) supported by network management application 120 and/or SNMP manager 150. Alternatively or additionally, the configuration may be performed programmatically, such as by automatically grouping or clustering events into a particular group based on their similarity in a property or behavior. The similarity may relate to one or more of the following: event code (see 411); module name (see 412) or event source triggering each event; severity level (see 413); event frequency; description keyword or keywords (see 416 and see 417), etc.

For example, as will be described using FIG. 4B, events with similar nature may be grouped together, such as one group for events relating to configuration changes and another group for events relating to upgrades. In another example, events 410-450 with event codes within a specific range (e.g., "240000" to "240004") may be automatically added to group 400 without requiring any manual input from an end user. Further, events with low severity or events with high frequency may be automatically grouped together.

In the example in FIG. 4A, group 400 is uniquely identified by an object identifier (OID). In SNMP, OIDs is used to identify objects that are stored in a database called Management Information Base (MIB). The OID is generally a long sequence of numbers separated by dots. For example, "group.config" may be associated with OID=1.3.6.1.4.1.6876.90.1.2.0.1.0.1 with a format of <rootOID>.<groupRootOID>. <groupOID>, where rootOID=1.3.6.1.4.1.6876.90.1.2 identifies a root-level trap OID; groupRootOID=0.1.0 identifies a group-level root OID; and groupOID=1 identifies the specific "group.config."

When another group (say, "group.upgrade") is configured, a different OID is assigned to that group (e.g., OID=1.3.6.1.4.1.6876.90.1.2.0.1.0.2). Configuration information (see 126 in FIG. 1) relating to each group and their members may be stored in a property file accessible by network management entity 110 during event notification, such as storage 119 in FIG. 1. FIG. 4B illustrates example group configuration information 126. For simplicity, only a snippet is shown in FIG. 4B, and configuration information 126 may include any additional and/or alternative configuration information than that shown in practice.

Figure 4B:
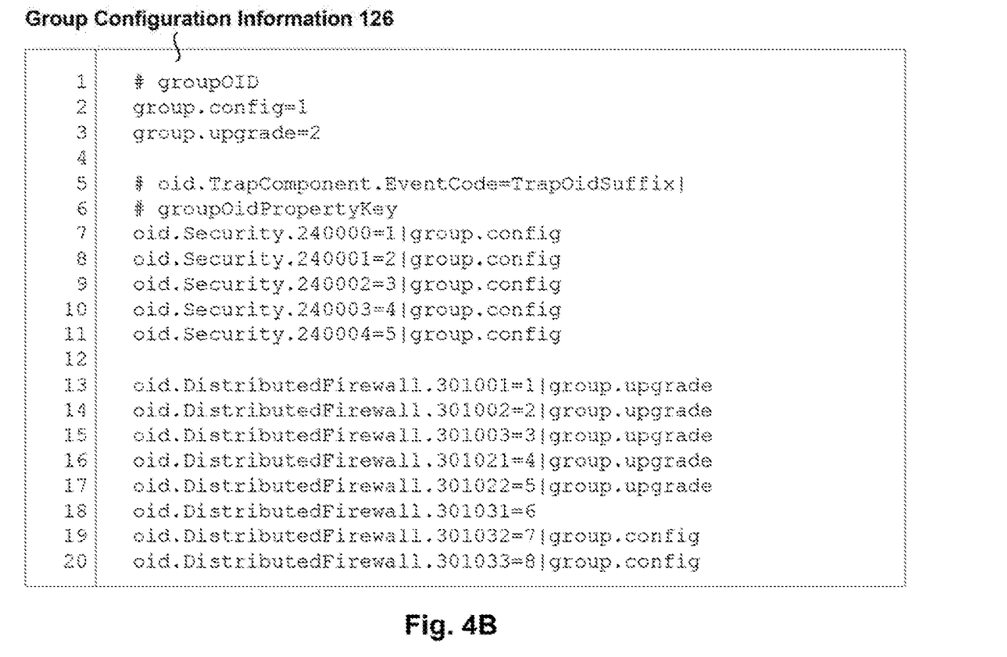
FIG. 4B illustrates example group configuration information.

In a first example in FIG. 4B, "group.config=1" (see line 2) is to define groupOID=1 for "group.config." At line 7, "oid.Security.240000=1|group.config" is to define event code="240000" as a member of "group.config," and "Security" indicates that the event source is a security module (e.g., on network device 132). Pipe symbol "|" is used to pipe or attach a particular event to a group. Similarly, event codes "240001" (see line 8), "240002" (see line 9), "240003" (see line 10), "240004" (see line 11), "301032" (see line 19) and "301033" (see line 20) are also configured as members of "group.config."

In a second example in FIG. 4B, "group.upgrade=2" (see line 3) defines another group labelled "group.upgrade" with groupOID=2. Members of "group.upgrade" include events with respective event, codes "301001" (see line 13), "301002" (see line 14), "301003" (see line 15), "301021" (see line 16) and "301022" (see line 17). Similarly, "oid.DistributedFirewall.301001=1|group.upgrade" (see line 13) is to configure event code="301001" as a member of, the group and "oid.DistributedFirewall" indicates that the event source is a DFW module (e.g., on host 136).

It is, however, not necessary to assign each event defined in configuration information 126 to a group. For example, at line 18, an event with event code "301031" does not belong to any group. In this case, if the event is detected, management entity 100 will generate and send an individual event notification to SNMP manager 150. This allows group notification to be implemented in conjunction with conventional individual notification.

Example Group-Based Network Event Notification

Once group configuration is performed according to block 310 in FIG. 3, network management entity 110 may perform group-based network event notification according to blocks 315 to 350 in FIG. 3. In the following, some examples will be explained using FIG. 5, which is a schematic diagram illustrating example group-based network event notification 500 based on the group configuration in FIG. 4A and FIG. 4B.

Referring first to FIGS. 3, at 315, 320 and 325, in response to detecting an event associated with managed node 130, network management entity 110 determines an event code of the event and whether the event code is a member of any group. For example, this may involve first mapping the event to the event code, and then mapping the event code to the group based on configuration information 126. If the event code is not a member of any group, at 330 in FIG. 3, network management entity 110 sends an individual notification for that event. Otherwise, at 335 in FIG. 3, network management entity 110 withholds notification of the event, and increases a counter that keeps track of the number of events detected for the group.

Figure 5:
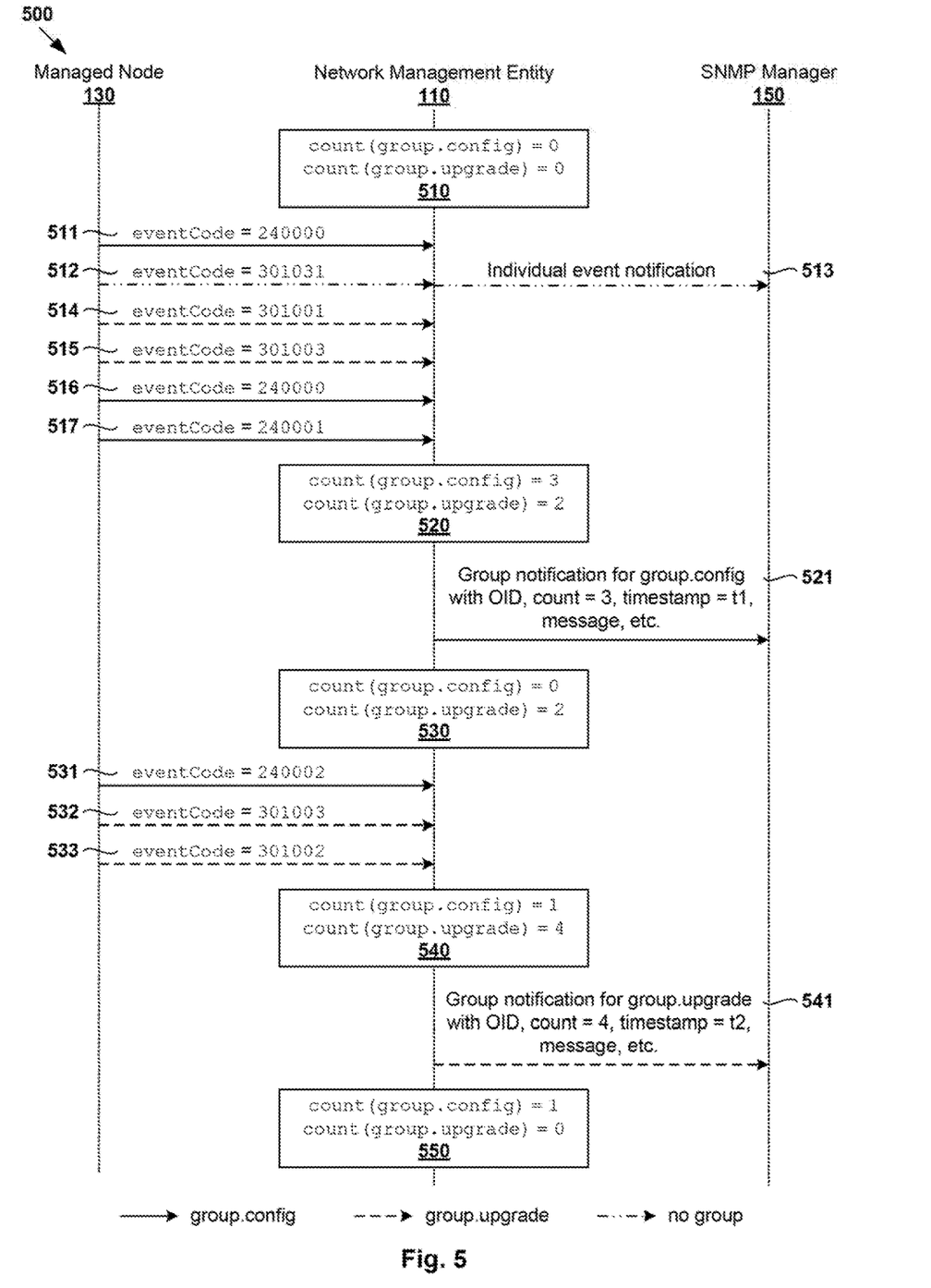
FIG. 5 is a schematic diagram illustrating example group-based network event notification based on the group configuration in FIG. 4A and FIGS. 4B.

For example at 510 in FIG. 5, a counter is maintained for each group and initialized to zero prior to network event detection. At 511 in FIG. 5, a first event is detected. Since associated event code="240000" is a member "group.config" (see line 7 in FIG. 4B), notification for the first event is withheld and associated counter incremented from zero to one (not shown for simplicity). On the other hand, at 512 in FIG. 5, a second event with event code="301031" is not a member of any group (see line 18 in FIG. 4B). In this case, at 513 in FIG. 5, an individual notification is sent to SNMP manager 150.

The above may be repeated every time an event is detected. For example in FIG. 5, in response to detecting a third event (see "301001" at 514) and a fourth event (see "301003" at 515), individual notifications are withheld, and associated counter of "group.upgrade" incremented. Similarly, in response to detecting a fifth event (see "240000" at 516) and a sixth event (see "240001" at 517), individual notifications are also withheld. At 520 in FIG. 5, count=3 for "group.config" and count=2 for "group.upgrade" following the above events.

Referring to FIG. 3 again, at 340, network management entity 110 also determines whether to send a group notification. This may involve whether one or more conditions are satisfied, such as a time-based condition, a count-based condition, a combination thereof, etc. Using the time-based condition (e.g., every five minutes), group notifications are sent periodically for a particular group, provided its associated counter is greater than zero. Using the count-based condition, a group notification may be sent as soon as a pre-determined number of events belonging a particular group are detected. Different groups may also have different group notification conditions.

At 345 in FIG. 3, if the condition or conditions are satisfied, network management entity 110 generates a group notification for the group. The group notification is an aggregate notification to report the detection of multiple events associated with the group. At 350 in FIG. 3, network management entity 110 also stores information relating to the events reported in the group notification in association with the OID of that group. For example, the information may be stored in an MIB file, which is accessible by an end user via SNMP manager 150 and network management application 110. At 355 in FIG. 3, the group notification is sent to SNMP manager 150, and the associated counter reset to zero.

In a first example in FIG. 5, network management entity 110 generates and sends a first group notification (see 521) for "group.config" to SNMP manager 150 to report three events detected at 511, 516 and 517. In this case, the first group notification may include OID=1.3.6.1.4.1.6876.90.1.2.0.1.0.1; count=3 for "group-.config"; timestamp (e.g., t1); and a summary of the events detected. For example, the summary may be a brief message saying "This notification is being sent as <count=3> events relating to configuration changes in the last 5-minute interval." The counter for "group.config" is then reset from three (see 520) to, zero (see 530).

In a second example in FIG. 5, network management entity 110 generates and sends a second group notification (see at 541) for "group.upgrade" to SNMP manager 150 to report four events detected at 514, 515, 532 and 533. In this case, the second group notification may include OID=1.3.6,1,4.1.6876.90.1.2.0.1.0.2; count=4; timestamp (e.g., t2); and a summary of the events detected (e.g., "This notification is being sent as <count=4> events relating to upgrades in the last 10-minute interval"). The counter for "group.upgrade" is then reset from four (see 540) to zero (see 550). Note that the counter for "group.config" has a value=one based on a new event at 531.

Although not shown in FIG. 5, the group notification at 521/541 also includes a source IP address of network management entity 110; destination IP address of SNMP manager 150; and universally unique identifier (UUID) of network management entity 110, etc. In practice, tens or hundreds of events associated with a large number of managed nodes 130 may be aggregated and reported together in a single group notification. Using group-based network event notification, fewer notifications are sent from network management entity 110 to SNMP manager 150 to reduce the consumption of computing and network resources Further, the summary in the group notification may be designed to reduce the amount of information that needs to be considered by the end user.

Figure 6:
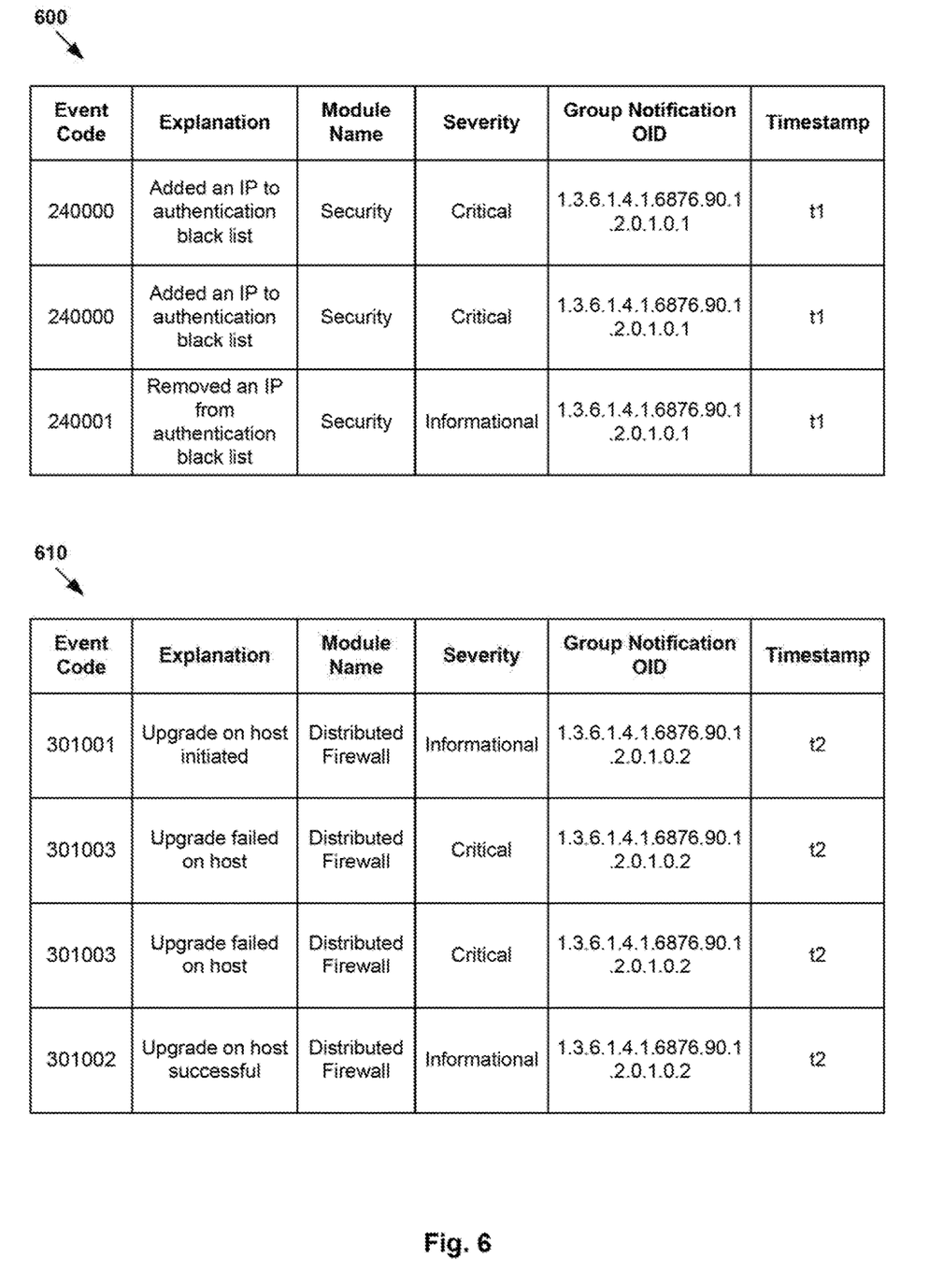
FIG. 6 is a schematic diagram illustrating example information relating to events reported in the group notifications in FIG. 5.

Information relating to events reported in a group notification is stored in an MIB file in association with the relevant OID. For example, FIG. 6 is a schematic diagram illustrating example information 600, 610 relating to events reported in group notifications 521, 541 in FIG. 5. In a first example in FIG. 6, information 600 is related to the first group notification generated and sent at 521 in FIG. 5. Information 600 includes details of the reported events with respective event codes "240000" (see 511 in FIG. 5), "240000" (see 516 in FIGS. 5) and "240001" (see 517 in FIG. 5). Each of these events are stored in association with the OID=1.3.6.1.4.1.6876.90.1.2.0.1.0.1 of "group.config" and timestamp (e.g., t1) of the first group notification.

In a second example in FIG. 6, information 610 is related to the second group notification generated and sent at 541 in FIG. 5. Information 610 includes details of the reported events with respective event codes "301001" (see 514 in FIG. 5), "301003" (see 515 in FIG. 5), "301003" (see 532 in FIGS. 5) and "301002" (see 534 in FIG. 5). Each of these events are stored in association with the OID=1.3.6.1.4.1.6876.90.1.2.0.1.0.2 of "group.upgrade" and timestamp (e.g., t2) of the second group notification. Additional details, such as detailed description 417 of each event (not shown for simplicity), may also be accessed if required.

In practice, information 600, 610 in FIG. 6 may be accessed by the end user via any suitable user interface supported by network management entity 110 SNMP manager 150. For example, network management application 120 may be implemented using a layered architecture that includes (1) a facade layer; (2) a service layer and (3) a data access object (DAO) layer. The façade layer is to handle calls received via the user interface or Representational State Transfer (REST) controllers. The service layer is to implement rules relating to SNMP services (e.g., including group notification handler 122). The DAO layer is to handle storage and, retrieval of information, such as configuration information 126 in storage 119. Information relating to events 140 and corresponding group notifications may also be requested by SNMP manager 150, such as by sending GET or GET-NEXT messages to SNMP agent 124. In response, SNMP agent 124 provides the requested information using GET-RESPONSE messages.

Although various examples have been described using network management entity 110 in FIG. 1, it should be understood that a distributed approach may be used to implement group-based network event notification according to examples of the present disclosure. For example, the functionality of network management application 120 (e.g., including group notification handler 122) may be distributed among at least some managed nodes 130. In this case, particular managed node 130 may be configured to map an event to a group, and send a "first" group notification to network management entity 110 for multiple events that belong to that group and detected at that managed node 130. At network management entity 110, "first" group notifications from multiple managed nodes 130 may be analyzed and further aggregated into one or more "second" group notifications that are then delivered to SNMP manager 150.

To implement the distributed approach, groups associated with the "first" and "second" group notifications may be configured using network management entity 110, etc. Information relating to groups and associated events (e.g., FIG. 4A and FIG. 4B) may then be distributed to managed nodes 130. Similar to the examples discussed using FIG. 1 to FIG. 6, group notifications associated with a particular group (e.g., "group.config") may be associated with an OID for that particular group. Also, information relating to detected events may be stored in association with the OID in the MIB for later access by the end user.

In practice, a multi-level process may be then used to trace back to specific events. For example, at the first level, each "second" group notification may be mapped to one or more "first" group notifications (i.e., from notification consumer 150 to network management entity 110). At the second level, each first group notification may be mapped to one or more detected events at particular managed node 130 (i.e., from network management entity 110 to managed nodes 130). Using the distributed approach, network traffic between managed nodes 130 and network management entity 110, as well as processing burden on network management entity 110 may be further reduced.

Computer System

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, when executed by the processor, cause the processor to perform processes described herein with reference to FIG. 1, to FIG. 6. For example, computer system capable of acting as network management entity 110 may be deployed in network environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g. as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a network manager to perform group-based network event notification in a network environment that includes the network manager and a notification consumer, the method comprising:

prior to network event detection, configuring a group to include at least a first network event and a second network event in accordance with configuration information, wherein the configuration information specifies: a different event code for each network event that belongs in the group, a different group identifier for each group of a plurality of groups, and different event types that are included in a same group such that the first network event and the second network event are different event types included in the group;

in response to detection of the first network event and determination that a first event code of the first network event is associated with a group identifier of the group, withholding notification of the first network event to the notification consumer;

in response to detection of the second network event and determination that a second event code of the second network event is associated with the group identifier of the group, withholding notification of the second network event to the notification consumer;

generating a group notification associated with the group, wherein the group notification is an aggregate notification of at least the first network event and second network event; and sending the group notification to the notification consumer, wherein:

detection of the first network event comprises determination that the first event code of the first network event is within a range of event codes associated with the group identifier of the group; and detection of the second network event comprises determination that the second event code of the second network event is within the range of event codes associated with the group identifier of the group.

2. The method of claim 1, wherein the group notification is sent in response to satisfaction of a notification condition associated with the group, wherein the notification condition specifies when to send group notifications for the group, and wherein different groups of the plurality of groups have different notification conditions that specify when to send group notifications for each group.

3. The method of claim 1, wherein generating the group notification comprises:

generating the group notification to include at least one of: the group identifier of the group, a total count of network events detected, a summary of network events detected, and a timestamp of the group notification.

4. The method of claim 1, further comprising:

storing, in a management information base, information relating to the first network event and the second network event in association with the group identifier of the group for later access by an end user of the notification consumer.

5. The method of claim 1, wherein generating the group notification comprises:

generating the group notification responsive to determination that a notification condition, which includes at least one of a time-based condition or a count-based condition, is satisfied.

6. The method of claim 1, further comprising:

in response to determination that the first event code of the first network event or the second event code of the second network event is associated with the group identifier of the group, incrementing a counter associated with the group.

7. A non-transitory computer-readable storage medium that includes a set of instructions which, in response to execution by a processor of a network manager, cause the processor to perform a method of group-based network event notification in a network environment that includes the network manager and a notification consumer, the method comprising:

prior to network event detection, configuring a group to include at least a first network event and a second network event in accordance with configuration information, wherein the configuration information specifies: a different event code for each network event that belongs in the group, a different group identifier for each group of a plurality of groups, and different event types that are included in a same group such that the first network event and the second network event are different event types included in the group;

in response to detection of the first network event and determination that a first event code of the first network event is associated with a group identifier of the group, withholding notification of the first network event to the notification consumer;

in response to detection of second network event and determination that a second event code of the second network event is associated with the group identifier of the group, withholding notification of the second network event to the notification consumer;

generating a group notification associated with the group, wherein the group notification is an aggregate notification of at least the first network event and second network event; and sending the group notification to the notification consumer, wherein:

detection of the first network event comprises determination that the first event code of the first network event is within a range of event codes associated with the group identifier of the group; and detection of the second network event comprises determination that the second event code of the second network event is within the range of event codes associated with the group identifier of the group.

8. The non-transitory computer-readable storage medium of claim 7, wherein the group notification is sent in response to satisfaction of a notification condition associated with the group, wherein the notification condition specifies when to send group notifications for the group, and wherein different groups have different notification conditions that specify when to send group notifications for each group.

9. The non-transitory computer-readable storage medium of claim 7, wherein generating the group notification comprises:

generating the group notification to include at least one of: the group identifier of the group, a total count of network events detected, a summary of network events detected, and a timestamp of the group notification.

10. The non-transitory computer-readable storage medium of claim 7, wherein the method further comprises:

storing, in a management information base, information relating to the first network event and the second network event in association with the group identifier of the group for later access by an end user of the notification consumer.

11. The non-transitory computer-readable storage medium of claim 7, wherein generating the group notification comprises:

generating the group notification responsive to determination that a notification condition, which includes at least one of a time-based condition or a count-based condition, is satisfied.

12. The non-transitory computer-readable storage medium of claim 7, wherein the method further comprises:

in response to determination that the first event code of the first network event or the second event code of the second network event is associated with the group identifier of the group, incrementing a counter associated with the group.

13. A network manager configured to perform group-based network event notification in a network environment that includes the network manager and a notification consumer, the network manager comprising:

a processor; and a non-transitory computer-readable medium having stored thereon instructions, which in response to execution by the processor, cause the processor to:

prior to network event detection, configure a group to include at least a first network event and a second network event in accordance with configuration information, wherein the configuration information specifies: a different event code for each network event that belongs in the group, a different group identifier for each group of a plurality of groups, and different event types that are included in a same group such that the first network event and the second network event are different event types included in the group;

in response to detection of the first network event and determination that a first event code of the first network event is associated with a group identifier of the group, withhold notification of the first network event to the notification consumer;

in response to detection of the second network event and determination that a second event code of the second network event is associated with the group identifier of the group, withhold notification of the second network event to the notification consumer;

generate a group notification associated with the group, wherein the group notification is an aggregate notification of at least the first network event and second network event; and send the group notification to the notification consumer, wherein:

instructions for the detection of the first network event cause the processor to determine that the first event code of the first network event is within a range of event codes associated with the group identifier of the group; and instructions for the detection of the second network event cause the processor to determine that the second event code of the second network event is within the range of event codes associated with the group identifier of the group.

14. The network manager of claim 13, wherein the group notification is sent in response to satisfaction of a notification condition associated with the group, wherein the notification condition specifies when to send group notifications for the group, and wherein different groups of the plurality of groups have different notification conditions that specify when to send group notifications for each group.

15. The network manager of claim 13, wherein the instructions to cause the processor to generate the group notification cause the processor to:

generate the group notification to include at least one of: the group identifier of the group, a total count of network events detected, a summary of network events detected, and a timestamp of the group notification.

16. The network manager of claim 13, wherein the instructions further cause the processor to:

store, in a management information base, information relating to the first network event and the second network event in association with the group identifier of the group for later access by an end user of the notification consumer.

17. The network manager of claim 13, wherein the instructions to cause the processor to generate the group notification cause the processor to:

generate the group notification responsive to determination that a notification condition, which includes at least one of a time-based condition or a count-based condition, is satisfied.

18. The network manager of claim 13, wherein the instructions further cause the processor to:

in response to determination that the first event code of the first network event or the second event code of the second network event is associated with the group identifier of the group, increment a counter associated with the group.

\* \* \* \* \*